United States Patent
Lulofs et al.

[11] Patent Number: 6,006,656
[45] Date of Patent: *Dec. 28, 1999

[54] TOASTER WITH POWER OUTPUT CONTROL

[75] Inventors: Klaas J. Lulofs; Roelf Van Der Wal, both of Drachten, Netherlands

[73] Assignee: U.S. Philips Corporation, New York, N.Y.

[ * ] Notice: This patent is subject to a terminal disclaimer.

[21] Appl. No.: 09/054,106

[22] Filed: Apr. 2, 1998

[30] Foreign Application Priority Data

Apr. 3, 1997 [EP] European Pat. Off. ............ 97200979

[51] Int. Cl.⁶ .............................. A47J 37/08; H05B 1/02
[52] U.S. Cl. ............................. 99/327; 99/331; 99/385; 99/389; 219/492; 219/521
[58] Field of Search ........................ 99/326–331, 385, 99/333, 389–393, 400, 401; 219/521, 492, 411, 494, 413, 497, 254, 542, 544, 501, 543, 518

[56] References Cited

U.S. PATENT DOCUMENTS

| | | | |
|---|---|---|---|
| 4,491,066 | 1/1985 | Juriga et al. | 99/391 |
| 4,791,862 | 12/1988 | Hoffmann | 99/385 |
| 5,181,455 | 1/1993 | Masel et al. | 219/521 X |
| 5,390,588 | 2/1995 | Krasznai et al. | 99/389 |
| 5,692,432 | 12/1997 | Hazan et al. | 99/328 |

FOREIGN PATENT DOCUMENTS 9740729  11/1997  WIPO .

*Primary Examiner*—Timothy F. Simone
*Attorney, Agent, or Firm*—Ernestine C. Bartlett

[57] ABSTRACT

A toaster has heating elements (H1, H2) arranged at opposite sides of a product (5) to be toasted. The size of the product to be toasted (5) is detected by a sensor, for example a mechanical sensor (2.1, 2.2, 2.3) or an optical sensor device with a photo-emitter and a photo-receiver. The power delivered by the heating elements (H1, H2) is controlled in dependence on the detected size. Thus, the power consumption of the toaster is adapted to the size of the product to be toasted and overheating of the product is avoided and a constant toasting time is obtained.

17 Claims, 6 Drawing Sheets

TOASTER WITH POWER OUTPUT CONTROL

BACKGROUND OF THE INVENTION

The invention relates to a toaster comprising: a toasting chamber for receiving a product to be toasted and at least one heating element arranged in the toasting chamber for heating the product.

Toasters of this type are generally known. The bread to be toasted is inserted into the toasting chamber and is exposed to heating by the heating element. The number of heating elements depends on the type of toaster. There are types having a centrally mounted heating element, enabling a slice of bread to be placed on either side of the heating element. In this type the slice of bread should be turned in order to allow both sides of the slice to be toasted. There are also types having two heating elements, the slice being interposed between the heating elements and both sides being toasted at the same time. There is a trend towards and a demand for toasters having a larger toasting chamber in order to enable as many as possible different types of bread having just as many different sizes to be toasted. A larger toasting chamber requires larger heating elements with higher power ratings so as to maintain the power density over the increased area. A disadvantage is that such a toaster consumes more current than usually necessary, that a smaller than normal piece of bread is toasted more rapidly than envisaged for a normal piece of bread, and that comparatively small pieces of bread are heated more intensively by the surplus heating area of the heating element and become too dark or even charred.

SUMMARY OF THE INVENTION

It is an object of the invention to provide a toaster which is more suited for toasting bread of varying sizes. To this end, according to the invention, the toaster of the type defined in the opening paragraph is characterized in that the toaster further comprises: detection means for determining a dimension of the product and means for controlling the power output of the at least one heating element in dependence on the dimension of the product.

The detection means measure the size of the bread to be toasted and the heat produced by the heating elements is adapted to the size of the piece of bread. The toasting time is then more constant for bread of different sizes. Moreover, overheating of the edges of the bread and unnecessary power consumption are precluded.

With respect to the detection means an embodiment of the toaster is characterized in that the detection means comprise: at least one sensor arranged in the toasting chamber for detecting the presence of the product to be toasted in the toasting chamber. Sensors which are suitable for this purpose can be constructed as a mechanical sensor or as an optical sensor with a photo-emitter and a photo-receiver, but in principle other sensors are also possible. The piece of bread comes into contact with the mechanical sensor or interrupts the light beam of the optical sensor upon introduction into the toasting chamber. In the case of a plurality of sensors arranged at different locations in the toasting chamber, for example each spaced two centimeters further away from a reference location, a distinction can be made between different bread sizes.

In the case of toasters of the type having two heating elements, in which the slice of bread is positioned between the heating elements, the bread is generally brought into the toasting chamber by means of a lift. This lift can be operated by hand but there are also motor-driven versions. In order to determine the size of the bread an embodiment of the toaster in accordance with the invention is characterized in that the toaster further comprises: a motor lift for introducing the product into the toasting chamber, time measurement means for measuring an activation time of the sensor during the movement of the product past the sensor, and calculating means for calculating the dimension of the product in response to the activation time and a transport speed of the motor lift.

As the lift descends into the toasting chamber the piece of bread moves past the sensor. The time of passage is measured and the size of the piece of bread is calculated on the basis of the transport speed of the lift. Thus, the presence of the motor lift can be used advantageously for accurately determining the size of the piece of bread.

Since the transport speed may be subject to spread, the calculated size is also subject to spread. In order to allow for this, a further embodiment of the toaster in accordance with the invention is characterized in that the motor lift is adapted to move the product to an end position situated at a predetermined distance from the sensor, and the toaster further comprises: further time measurement means for measuring the transport time expiring between the instant at which the activation of the sensor begins during the movement of the product past the sensor and the instant at which the end position is reached, and further calculating means for calculating the transport speed in response to the transport time and the predetermined distance. By always moving the bread to a fixed end position relative to the sensor it is possible to calculate the transport speed by measuring the time necessary to move the bread over the known distance between the sensor and the end position. The exact value of the transport speed then no longer plays a part in the calculation of the size of the bread.

Determining the size of the bread by means of a motor lift makes it possible to further optimize the process of toasting smaller pieces of bread. To this end, an embodiment of the toaster in accordance with the invention is characterized in that the motor lift is adapted to convey the product to a predetermined position with respect to the at least one heating element after calculation of the dimension of the product. The motor lift can thus raise a small piece of bread, which would otherwise be lowered to the bottom of the toasting chamber, until the piece of bread is in an optimum position with respect to the heating surface of the heating elements. Generally, the optimum position will be such that the center of the piece of bread corresponds to the center of the heating element.

For an even more convenient operation of the toaster an embodiment of the toaster is characterized in that the toaster further comprises means for activating the motor lift in response to a signal from the sensor. The sensor is activated when a slice of bread is inserted in the lift, as a result of which the motor lift is put into operation automatically.

The size of the piece of bread can also be determined accurately by means of a hand-operated lift. To this end, an embodiment of the toaster in accordance with the invention is characterized in that the toaster further comprises: a lift for introducing the product into the toasting chamber, means for detecting an activation of the sensor during the movement of the product past the sensor, means for measuring the travel of the lift during activation of the sensor, and calculating means for calculating the dimension of the product in response to the activation of the sensor and travel of the lift.

During the passage of the product, which is detected by the sensor, the distance covered by the lift in the toasting chamber is measured. The distance can be measured by means of a displacement sensor, for example an optical or mechanical pulse generator which generates pulses as long as the lift is in motion. The number of pulses counted during the movement of the product past the sensor is a measure of the size of the product. The travel of the lift can also be measured by means of a variable resistor whose resistance varies with the position of the lift in the toasting chamber.

In the type having two heating elements, where the slice of bread is placed between the heating elements, the ease of use can be improved with an embodiment of the toaster in accordance with the invention, which is characterized in that the toaster comprises two heating elements divided into sub-elements, which heating elements are arranged in the toasting chamber at either side of the product to be heated, and means for selectively activating one of the two heating elements separately or the two heating elements at the same time.

This enables one of the two heating elements to be turned off completely, so that it is also possible to toast bread having a crust on one side, such as French bread cut lengthwise.

BRIEF DESCRIPTION OF THE DRAWINGS

These and other aspects of the invention will be described and elucidated with reference to the accompanying drawings, in which.

In these Figures parts having the same function or purpose bear the same reference symbols.

DESCRIPTION OF THE PREFERRED EMBODIMENTS

Figure 1:
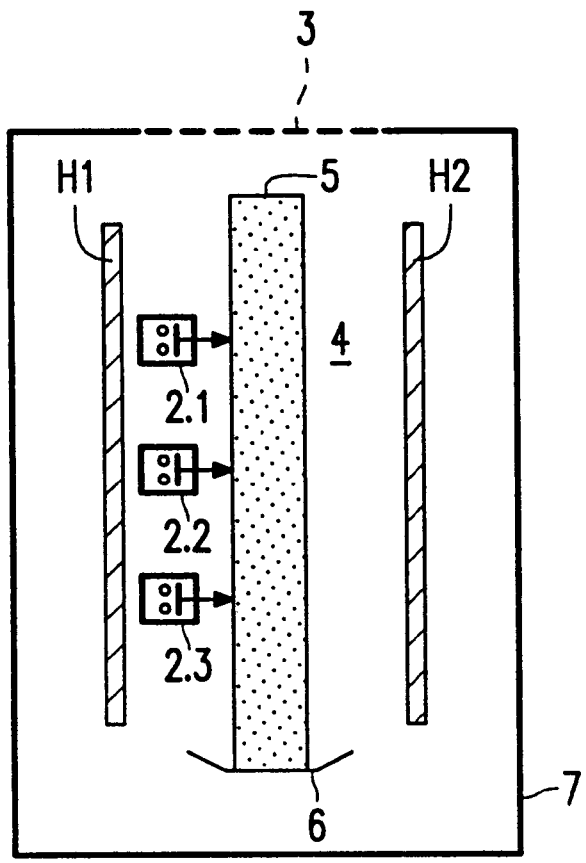
FIG. 1 is a cross-sectional view of an embodiment of a toaster in accordance with the invention.

FIG. 1 is a cross-sectional view showing an embodiment of a toaster in accordance with the invention. The toaster comprises a casing 7 which encloses a toasting chamber 4, in which two heating elements H1 and H2 are disposed at either side of one or more slices of bread 5, which can be brought into the toasting chamber 4 by means of a lift 6 via a slot 3 in the casing 7. The size of the product to be toasted is determined by means of one or more mechanical sensors 2.1, 2.2, 2.3 arranged at suitable locations inside the toasting chamber 4. The number of sensors that are activated increases as the piece of bread is larger.

Figure 2:
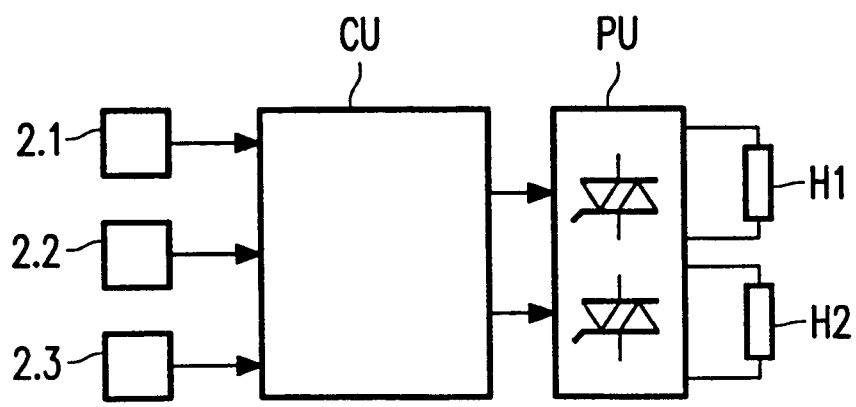
FIG. 2 is an electrical block diagram of an embodiment of a toaster in accordance with the invention.

FIG. 2 shows an electrical block diagram of the toaster. The status of the sensors 2.1, 2.2, 2.3 is read out by means of a control unit CU. The control unit supplies control signals to a power unit PU to which the heating elements H1 and H1 are connected. The power unit PU comprises, for example, triacs whose duty cycles are controlled by the control unit. If only the lower sensor 2.3 is activated the toasting chamber contains a small piece of bread and the control unit CU controls the power delivered by the heating elements H1 and H2 towards a smaller value. When the sensor 2.2. is also activated a somewhat larger piece of bread is present and the power is set to a higher value etc. The number of sensors can be selected as desired. Thus, depending on the number of sensors a distinction can be made between pieces of bread of different sizes. For example, when the height of the bread is 10, 12 and 14 cm the power output can be set to 800, 1000 and 1200 W, respectively. This prevents the situation in which the toaster consumes more current than normally necessary or in which comparatively small pieces of bread are heated more intensively by the surplus heating area of the heating elements and become too dark or even charred. An additional advantage is that the toasting time is independent of the dimensions of the piece of bread and the user need not worry about the optimum toasting time.

Figure 3:
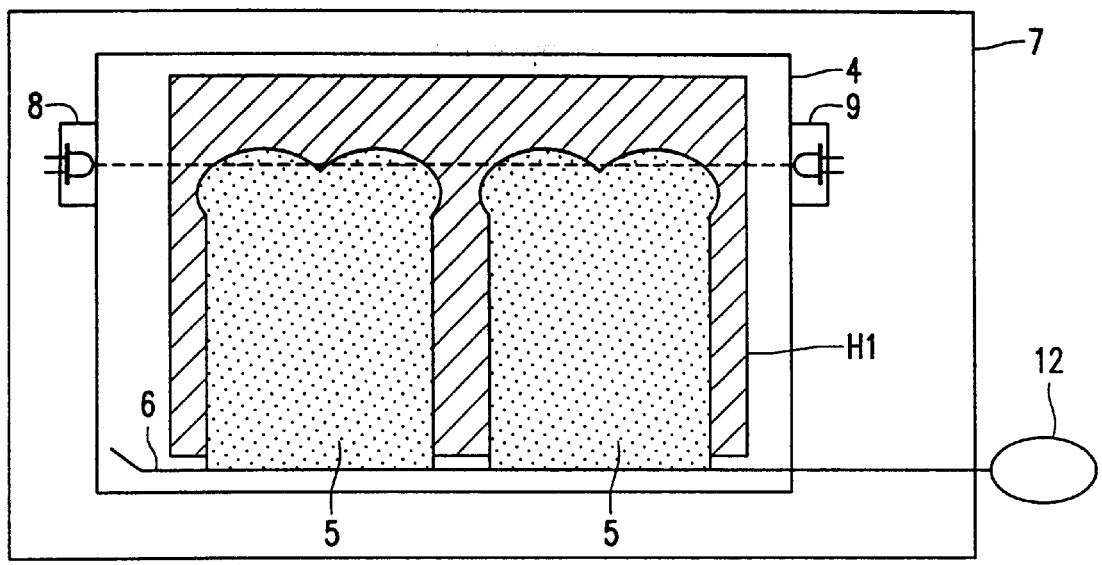
FIG. 3 is a longitudinal sectional view of an embodiment of a toaster in accordance with the invention.

FIG. 3 is a longitudinal sectional view showing the toaster having an optical sensor device for determining the size of the product to be toasted. The optical sensor device comprises an infrared (IR) photo-emitter 8 and an IR photo-receiver 9, arranged at a suitable height in the toasting chamber 4. The photo-emitter 8 emits an IR light beam to the IR photo-receiver 9 in the longitudinal direction of the toasting chamber 4 between the heating elements, so that for determining the size it is irrelevant how broad the slice of bread 5 is or where the slice is situated on the lift 6. The product 5 to be toasted, shown as two slices of bread 5 in FIG. 3, is placed on the lift 6 and is conveyed into the toasting chamber 4 by means of a handle 12. The product then interrupts the light beam from the IR photo-emitter 8. If the light beam is still interrupted by the product when the end position of the lift 6 is reached, the maximum toasting power is set, and if this is not the case a lower power is set. When a plurality of optical sensors are arranged above one another a distinction can be made between different dimensions of the piece of bread to be toasted.

The control unit CU for processing the sensor signals and for controlling the heating elements H1 and H2 becomes more complex as a larger number of sensors is used. By means of the optical sensor device shown in FIG. 3, and also by means of the mechanical sensors 2.1, 2.2 and 2.3, it is not possible to measure the exact height of the slice 5. This would require a very large number of sensors. However, by providing the toaster with a motor lift an accurate measurement of the size of the product to be toasted can yet be effected by means of only one mechanical or optical sensor device.

FIG. 4 again shows a longitudinal sectional view of the toaster. The optical sensor device with the IR photo-emitter 8 and the IR photo-receiver 9 has been transferred to the upper part of the toasting chamber 4, as a result of which the light beam is interrupted upon entry in the toasting chamber 4. The lift 6 is driven by an electric motor 10 via a toothed rack 11. By measuring the activation time during which the light beam is interrupted by the slice of bread 5 it is possible to calculate the height of the slice of bread on the basis of the measured activation time and the transport speed of the lift 6. Since the transport speed is subject to spread the calculated dimension is not always accurate. This inaccuracy can be eliminated by also measuring the time which expires between the instant at which the interruption of the light beam begins and the instant at which the end position of the lift 6 is reached. The end position is detected, for example, by means of a contact 14 which is activated when the lift 6 has descended wholly into the toasting chamber 4. The distance PD between the light beam and the end position of the lift 6 is a predetermined fixed distance. Thus, the transport time which expires to cover the distance PD is a measure of the transport speed. The height of the slice of bread can be calculated even more accurately from the ratio between the activation time and the transport time.

The motor lift can also be used for optimizing the position of the bread with respect to the heating elements, after the height of the slice of bread 5 has been measured, i.e. in such a manner that an imaginary line halfway the height of the slice 5 coincides with an imaginary line halfway the height of the heating elements H1 and H2. For this purpose, the lift 6 is raised again to the required height by means of the motor 10 by energizing the motor for a time which is calculated on the basis of the previously found activation time and, if applicable, the transport time. In this way, the surface of the slice of bread is always centered with respect to the radiant surface of the heating elements.

Figure 5:
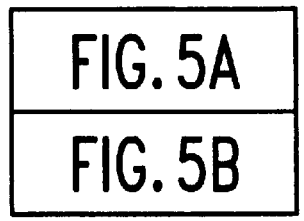
FIGS. 5, 5A, 5B are diagrams of electric circuits for use in an embodiment of a toaster in accordance with the invention.
Figure 5A:
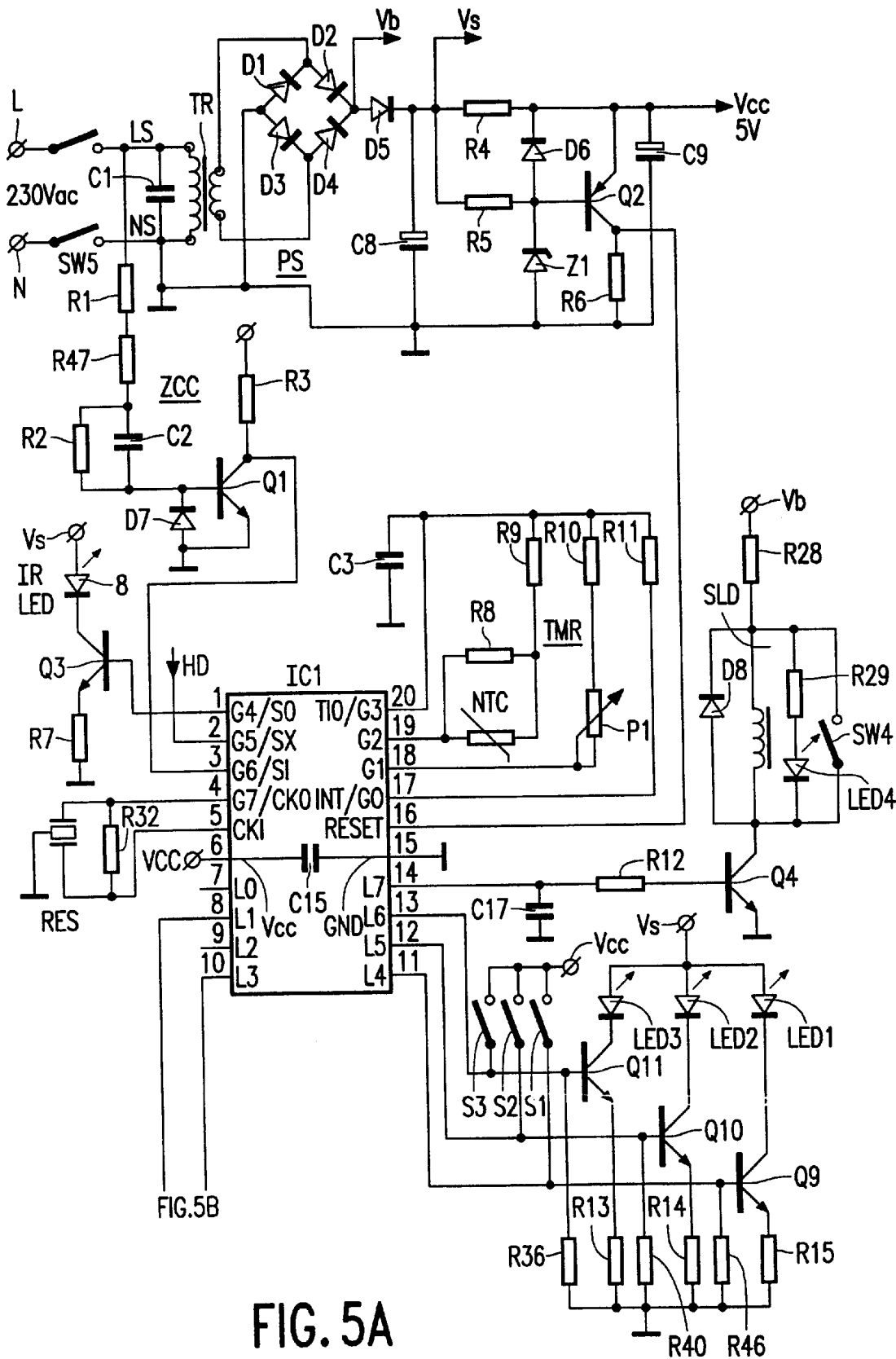
Figure 5B:
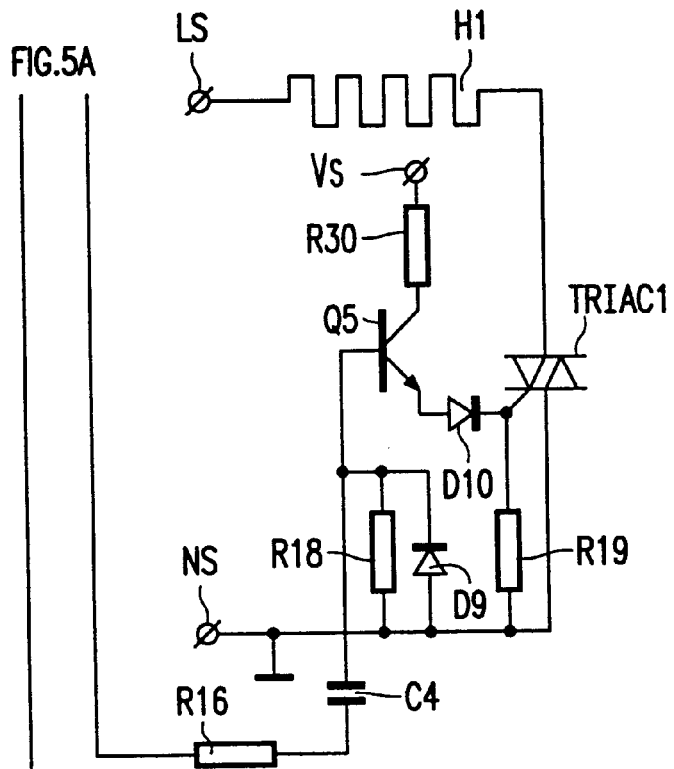
Figure 5B:
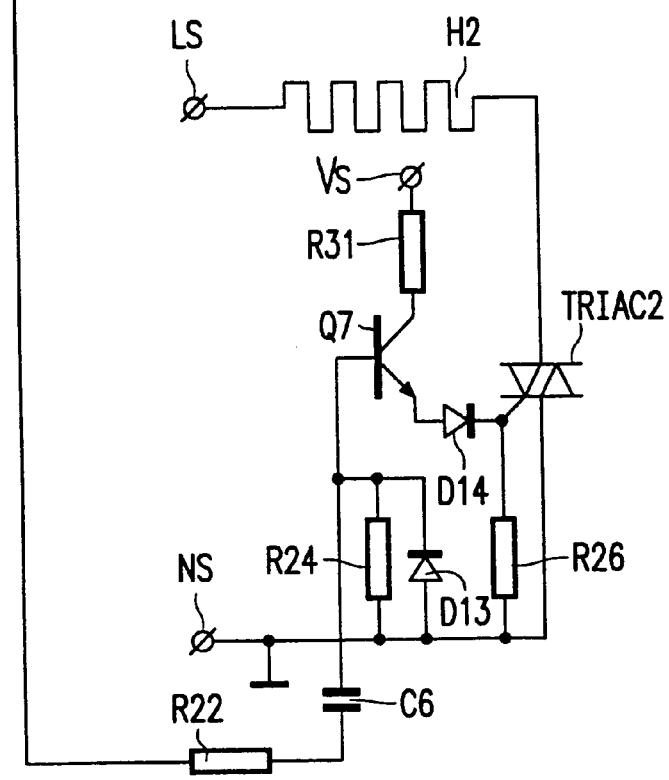

FIG. 5 is an electrical circuit diagram of the toaster shown in FIGS. 1 and 3. When the control handle 12 is pushed down the contacts of the main switch SW5 are closed in the end position of the lift 6, as a result of which the mains voltage on the terminals L and N is transferred to the terminals LS and NS, the terminal NS being connected to signal ground. A transformer TR steps down the high mains voltage to form a lower voltage, which is rectified by means of a rectifier bridge D1–D4, yielding a raw voltage Vb which energizes a solenoid SLD via a resistor R28. The raw voltage Vb is smoothed by a capacitor C8 via a diode D5, yielding a supply voltage Vs. The diode D5 prevents the capacitor C8 from being discharged through the solenoid SLD. The supply voltage Vs is further smoothed by a resistor R4 and a capacitor C9 and reduced to a supply voltage Vcc of, for example, 5 V. The voltage Vcc is connected to the emitter of a PNP transistor Q2, which has its collector connected to ground via a resistor R6 and which has its base connected to ground via a zener diode Z1. The zener diode Z1 receives a bias current derived from the supply voltage Vs via a resistor R5. The sum of the base-emitter voltage of the transistor Q2 and the zener voltage of the zener diode Z1 determines the magnitude of the supply voltage Vcc. When the mains voltage is turned on by means of the main switch SW5 the supply voltage Vs increases. The base of the transistor Q2 follows this increase until the zener voltage of the zener diode Z1 is reached. The supply voltage Vcc also increases but it increases more slowly than the supply voltage Vs owing to the resistor R4 and the capacitor C9. When a given value of the supply voltage Vcc is reached the transistor Q2 is turned on and the voltage across the resistor R6 increases rapidly from zero volts to approximately the supply voltage Vcc. The voltage variation across the resistor R6 is used to reset a microcontroller IC1. A diode D6 between the base and the emitter of the transistor Q2 protects the base-emitter junction of the transistor Q2 against excessive reverse voltages.

Upon receipt of the supply voltage Vcc and the reset pulse the microcontroller IC1 (type COP842CN) becomes operative, the clock frequency being determined by a resonator RES (for example a ceramic resonator at 5 MHz) with a parallel resistor R32. The microcontroller IC1 turns on a driver transistor Q4 via a resistor R12, which transistor is arranged in series with the solenoid SLD. As a result, the contacts of the main switch SW5 remain energized until the microcontroller IC1 turns off the driver transistor Q4, or until the solenoid SLD is short-circuited by means of a switch SW4 across the solenoid SLD, which switch is actuated by the user of the toaster. The lift 6 and the handle 12 are then released and the lift 6 moves the toasted bread outward.

The heating element H1 has one terminal connected to the terminal LS. The other terminal is coupled to the terminal NS for receiving the mains voltage via a first electronic switch TRIAC1. Likewise, the other heating element H2 is connected to the terminals LS and NS via a second electronic switch TRIAC2.

The trigger electrode of the electronic switch TRIAC1 receives control pulses from the emitter of an NPN transistor Q5 via a diode D10, which transistor has its collector connected to the supply voltage Vs via a resistor R30. A resistor R19 between the trigger electrode of the electronic switch TRIAC1 and the terminal NS prevents triggering in the absence of control pulses. The diode D10 prevents the transistor Q5 from being turned on if the mains voltage on the terminal LS is negative relative to the terminal NS. The base of the transistor Q5 receives control pulses from the microcontroller IC1 via a series resistor R16 and a coupling capacitor C4. The base of the transistor Q5 is connected to the terminal NS via a resistor 18 in parallel with a diode D9. The cathode of the diode D9 is connected to the base of the transistor Q5, as a result of which the negative base-emitter voltage of the transistor Q5 cannot become smaller than one diode voltage. The coupling capacitor C4 prevents the electronic switch TRIAC1 from being fired in the event of malfunctioning of the microcontroller IC1.

The other electronic switch TRIAC2 is controlled by means of similar electronic control circuitry. The microcontroller IC1 turns the electronic switches on and off in accordance with a Multi Cycle Control pattern, in which the electronic switches are on or off for full cycles of the mains voltage. For this purpose the microcontroller IC1 receives information from a zero cross circuit ZCC, which converts the sinusoidal mains voltage into a squarewave voltage of suitable amplitude and phase. The zero cross circuit ZCC comprises an NPN transistor Q1, which has its emitter connected to the terminal NS and which has its base connected to the terminal LS via three series-connected resistors R1, R47 and R2. The collector of the transistor Q1 is connected to the supply voltage Vcc by a resistor R3 and supplies a limited mains voltage to the microcontroller IC1. A capacitor C2 in parallel with the resistor R2 ensures that the signal transients in the limited mains voltage are in phase with the zero crossings of the mains voltage. A diode D7 prevents an excessive reverse voltage across the base and the emitter of the transistor Q1. Instead of triacs and Multi Cycle Control the heating elements can also be activated by means of other electronic switches, such as relays.

The toasting time is adjusted by means of a timer circuit TMR, the microcontroller IC1 comparing the resistance value of a control potentiometer P1 and a series resistor R10 with that of a reference resistor R11 by charging a capacitor C3 and subsequently discharging it via the reference resistor R11 and via the potentiometer P1 and the resistor R10, and comparing the discharge times. The microcontroller IC1 further measures the temperature in the toaster by comparing the resistance of a resistor circuit including a temperature-dependent resistor NTC with the reference resistor R11. This enables the on-time to be corrected for a cold or warm toaster.

By means of the switches S1, S2 and S3 a number of program options can be selected, indicators LED1, LED2 and LED3 indicating which options have been selected. By means of the switch S1 one-side toasting can be chosen. In that case only one of the heating elements H1 or H1 is active. By means of the second switch S2 it is possible to correct the toasting time for frozen bread, and by means of the third switch S3 the toasting time is limited to a fixed duration.

The IR photo-emitter 8 is an IR LED, which is turned on and off by the microcontroller IC1 via a driver transistor Q3 by means of a squarewave voltage on the base of the driver transistor Q3. The photo-receiver 9 receives the light from the photo-emitter 8 when the height of the product to be toasted is smaller than a given value. The received signal from the photo-receiver is amplified, filtered and limited by a circuit shown in FIG. 6 and is applied to the microcontroller IC1 as a signal HD. If the microcontroller IC1 receives a squarewave voltage the duty cycles of the electronic switches TRIAC1 and TRIAC2 are set to deliver less power, and if it does not receive a squarewave voltage the duty cycles are set to deliver more power.

Figure 6:
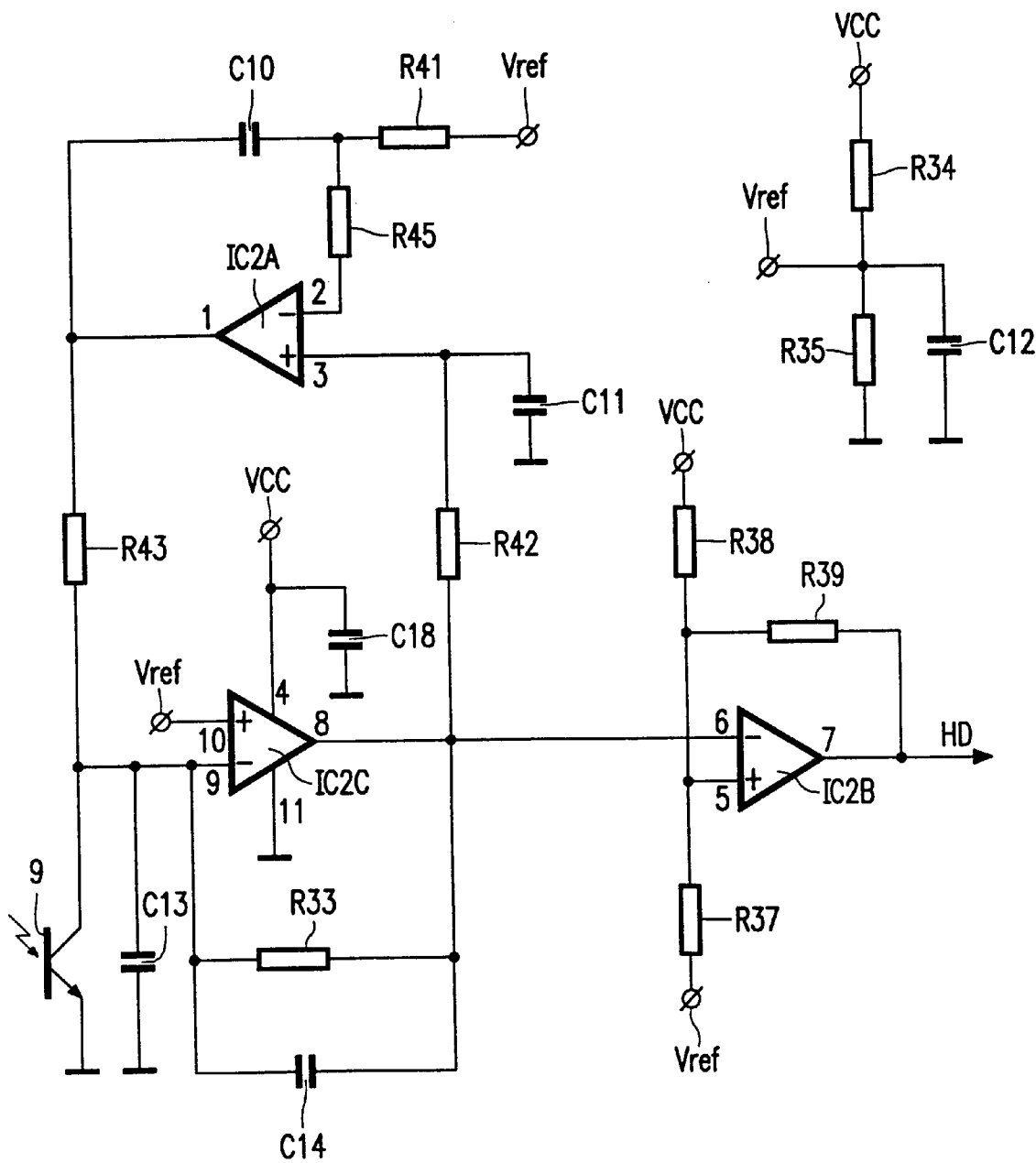
FIG. 6 is a diagram of an electric circuit for use in an embodiment of a toaster in accordance with the invention.

In the circuit shown in FIG. 6 the pulsating photo-current of the photo-receiver 9 is converted into a pulsating voltage by an amplifier IC2C and a feedback resistor R33, a comparator IC2B comparing this voltage with a threshold voltage which is subject to hysteresis in order to suppress the effect of interference on the pulsating voltage. By means of a resistor R42, a capacitor C11, an integrating buffer amplifier IC2A and a resistor R43 the pulsating voltage is converted into a current which is fed back in phase opposition to the input of the amplifier IC2C, which results in a high rejection of undesired low frequencies in the photo-current of the photo-receiver 9.

Figure 4:
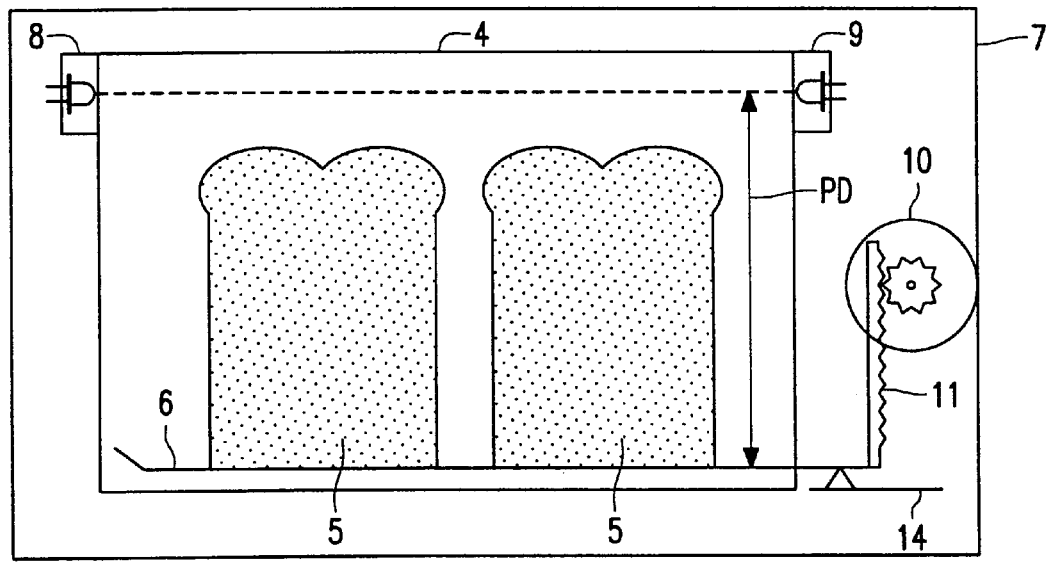
FIG. 4 is a longitudinal sectional view of an embodiment of a toaster in accordance with the invention.

For the embodiment with the motor lift as shown in FIG. 4 the circuit arrangement shown in FIG. 5 should be extended by a circuit for driving the motor 10. Moreover, the program of the microcontroller IC1 should include a routine for measuring the activation time during which the light beam is interrupted and, if desired, another routine for measuring the transport time which expires between the instant at which the interruption of the light beam begins and the instant at which the end position of the lift 6 is reached. For centering the bread with respect to the heating elements the program of the microcontroller IC1 should include a routine for activating the motor 10 in the reverse direction after the end position of the lift 6 has been reached.

The interruption of the light beam can also be utilized for automatically activating the motor lift. For this purpose it is alternatively possible to use a sensing device based on one or more mechanical sensors. When a slice of bread is inserted into the slot 3 the light beam is interrupted. This is signalled by the microcontroller IC1, which then puts the motor lift into operation. For this purpose, the electric circuits for the sensor, the signal processing of the sensor signal and the motor lift should be powered by voltages which are in standby when the toaster is connected to the mains voltage.

Figure 7:
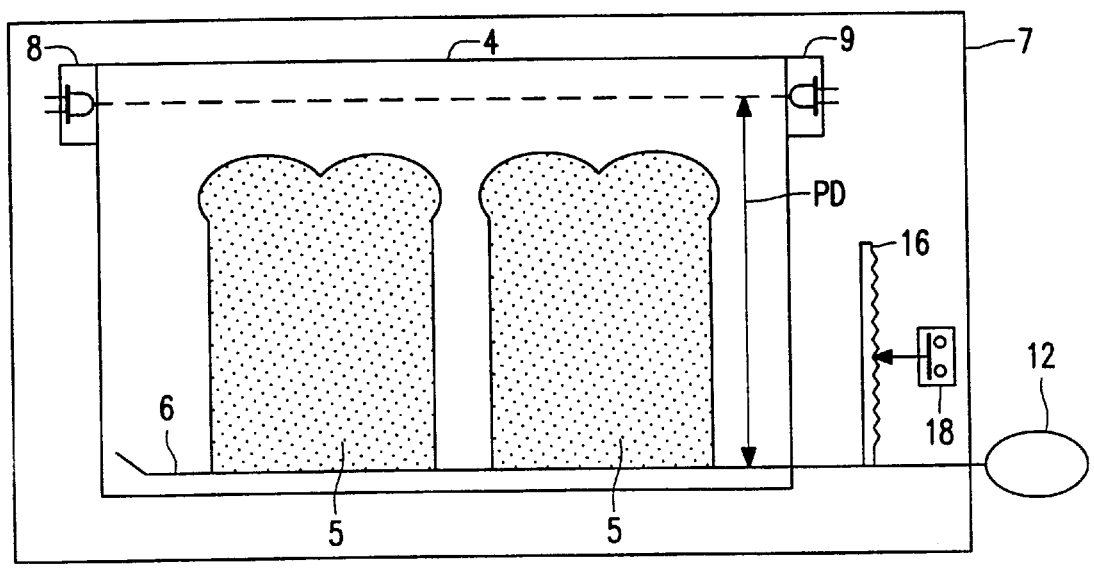
FIG. 7 is a longitudinal sectional view of an embodiment of a toaster in accordance with the invention.

FIG. 7 shows an alternative to the embodiment shown in FIG. 4, in which the motor lift has been used for accurately determining the dimensions of the slice. However, this accurate determination is also possible with a hand-operated lift. FIG. 7 shows the same toaster as shown in FIG. 4 but, instead of being motor-driven, the lift is now hand-operated by means of the handle 12, in the same way as in the toaster shown in FIG. 3. The travel of the lift 6 is measured by means of a mechanical cam structure 16, which is secured to the lift 6 and which cooperates with a switch 18. In the same way as in the toaster shown in FIG. 4, the optical sensor device comprising the IR photo-emitter 8 and the IR receiver 9 is arranged in the upper part of the toasting chamber 4. The light beam from the IR photo-emitter 8 is interrupted as soon as the slice 5 enters the toasting chamber 4 when the lift 6 is lowered by means of the handle 12. During this downward movement the cam structure 16 causes the switch 18 to be opened and closed. The number of times that the switch 18 is opened and closed during interruption of the light beam is a measure of the travel of the lift and, consequently, of the size of the slice 5, and can be measured by means of an electronic counting circuit. The counting pulses can also be generated by other means, for example by means of an additional photo-emitter and receiver, whose light beam is interrupted by a perforated strip which, just like the cam structure 16, is secured to the lift 6. Besides, the IR photo-emitter 8 and IR receiver shown can also be used for counting the light pulses produced by means of the strip. In that case pulses are counted only when the light beam is not interrupted by the slice 5 and the measurement is, in fact, a detection of the absence of bread. The signals from the IR receiver 9 and the switch 18 are processed in a control unit CU in a manner similar to that illustrated in FIG. 2. The control unit CU controls the power of the heating elements H1 and H2 on the basis of the pulse count.

As an alternative for the measurement of the travel of the lift 6 a rotary potentiometer can be used whose cursor is coupled to the lift 6 via a transmission, or an elongate slide potentiometer mounted vertically in the toasting chamber 4, whose cursor is coupled to the lift 6. The resistance variation of the potentiometer then forms a measure of the travel of the lift 6.

We claim:

1. A toaster which comprises: a toasting chamber for receiving a product to be toasted and at least one heating element arranged in the toasting chamber for heating said product, detection means for determining a dimension of said product to be toasted and means for controlling the power output of the at least one heating element in dependence on said determined dimension of said product to be toasted.

2. A toaster as claimed in claim 1, wherein the detection means comprise: at least one sensor, arranged in the toasting chamber, for detecting the presence of the product to be toasted in the toasting chamber.

3. A toaster as claimed in claim 2, wherein the at least one sensor comprises an optical sensor device including a photo-emitter for emitting and a photo-receiver for receiving a light beam.

4. A toaster as claimed in claim 2, wherein the sensor comprises a mechanical sensor.

5. A toaster as claimed in claim 2, wherein the toaster further comprises: a motor lift having a transport speed for introducing the product to be toasted into the toasting chamber, time measurement means for measuring an activation time of the sensor during the movement of the product to be toasted past the sensor, and calculating means for calculating the dimension of the product to be toasted in response to the activation time of the sensor and the transport speed of the motor lift.

6. A toaster as claimed in claim 5, wherein the motor lift is adapted to move the product to an end position situated at a predetermined distance from the sensor, and the toaster further comprises: further time measurement means for measuring a transport time expiring between the instant at which the activation of the sensor begins during the movement of the product to be toasted past the sensor and the instant at which the end position is reached, and further calculating means for calculating the transport speed in response to the transport time and the predetermined distance.

7. A toaster as claimed in claim 5, wherein the motor lift is adapted to convey the product to be toasted to a predetermined position with respect to the at least one heating element after calculation of the dimension of the product to be toasted.

8. A toaster as claimed in claim 5, wherein the toaster further comprises means for activating the motor lift in response to a signal from the sensor.

9. A toaster as claimed in claim 2, wherein the toaster further comprises: a lift for introducing the product to be toasted into the toasting chamber, means for detecting an activation of the sensor during the movement of the product to be toasted past the sensor, means for measuring the travel of the lift during activation of the sensor, and calculating means for calculating the dimension of the product to be tested in response to the activation of the sensor and travel of the lift.

10. A toaster as claimed in claim 1, wherein the toaster comprises two heating elements arranged in the toasting chamber at either side of the product to be heated, and means for selectively activating one of the two heating elements separately or the two heating elements at the same time.

11. A toaster as claimed in claim 3, wherein the toaster further comprises: a motor lift having a transport speed for introducing the product to be toasted into the toasting chamber, time measurement means for measuring an activation time of the sensor during the movement of the product to be toasted past the sensor, and calculating means for calculating the dimension of the product to be toasted in response to the activation time of the sensor and the transport speed of the motor lift.

12. A toaster as claimed in claim 4, wherein the toaster further comprises: a motor lift having a transport speed for introducing the product to be toasted into the toasting chamber, time measurement means for measuring an activation time of the sensor during the movement of the product to be toasted past the sensor, and calculating means for calculating the dimension of the product to be toasted in response to the activation time of the sensor and the transport speed of the motor lift.

13. A toaster as claimed in claim 6, wherein the motor lift is adapted to convey the product to be toasted to a predetermined position with respect to the at least one heating element after calculation of the dimension of the product to be toasted.

14. A toaster as claimed in claim 6, wherein the toaster further comprises means for activating the motor lift in response to a signal from the sensor.

15. A toaster as claimed in claim 7, wherein the toaster further comprises means for activating the motor lift in response to a signal from the sensor.

16. A toaster as claimed in claim 3, wherein the toaster further comprises: a lift for introducing the product to be toasted into the toasting chamber, means for detecting an activation of the sensor during the movement of the product to be toasted past the sensor, means for measuring the travel of the lift during activation of the sensor, and calculating means for calculating the dimension of the product to be tested in response to the activation of the sensor and travel of the lift.

17. A toaster as claimed in claim 4, wherein the toaster further comprises: a lift for introducing the product to be toasted into the toasting chamber, means for detecting an activation of the sensor during the movement of the product to be toasted past the sensor, means for measuring the travel of the lift during activation of the sensor, and calculating means for calculating the dimension of the product to be tested in response to the activation of the sensor and travel of the lift.

* * * * *